United States Patent [19]
Park

[11] 3,979,588
[45] Sept. 7, 1976

[54] LIGHT PROJECTING AND ABSORBING APPARATUS IN A SYSTEM FOR SELECTING AUTOMATICALLY DESIRED MUSIC IN PHONOGRAPHIC PLAYER

[76] Inventor: Jang Hwan Park, 537, Naechungri, Oedongmyon, Wolsung, Kyung Sang Buk-Do, South Korea

[22] Filed: Nov. 13, 1974

[21] Appl. No.: 523,422

Related U.S. Application Data

[63] Continuation-in-part of Ser. No. 384,108, July 30, 1973, abandoned.

[52] U.S. Cl. ............................ 250/239; 250/211 R; 250/216; 250/566; 250/570; 274/15 R
[51] Int. Cl.² ...................... H01J 5/16; G11B 7/06
[58] Field of Search ............... 250/239, 216, 211 R, 250/202, 566, 570; 235/61.11 E; 274/15 R

[56] References Cited
UNITED STATES PATENTS

| | | | |
|---|---|---|---|
| 3,341,710 | 9/1967 | Cade | 250/239 |
| 3,432,671 | 3/1969 | Edmonds | 250/211 R X |
| 3,684,889 | 8/1972 | Priessnetz et al. | 250/216 |
| 3,784,794 | 1/1974 | Allais | 250/566 X |
| 3,868,514 | 2/1975 | Israelsson | 250/566 |

*Primary Examiner*—Eugene LaRoche

[57] ABSTRACT

A detecting unit for an automatic tune selection apparatus of a phonographic record player comprising a light projector and a CdS photoelectric element housed in a casing, said casing having a cylindrical light shield barrel extending axially downwardly therefrom having a constricted aperture formed thereon at the lower end portion thereof so as to form a limited passage for exclusive reception of the reflection of light rays from its own light source, warding off all the reflections of the light source from outside, thereby ensuring accurate actuation of said detecting unit for the automatic tune selection system without any incidental failure.

1 Claim, 3 Drawing Figures

LIGHT PROJECTING AND ABSORBING APPARATUS IN A SYSTEM FOR SELECTING AUTOMATICALLY DESIRED MUSIC IN PHONOGRAPHIC PLAYER

This is a continuation-in-part of U.S. Ser. No. 384,108 filed July 30, 1973, now abandoned.

BACKGROUND OF THE INVENTION

Field of Invention

The present invention relates to an improvement in a detecting unit for selecting, at will, a desired sound track of a gramophone record in an automatic tune selection apparatus. Such apparatus is intended for automatically selecting and playing, by means of a detecting unit mounted in a pick-up, using a light source and photoelectric element, a desired sound track from a plurality of the recorded bands of a long playing gramophone record.

Such devices have been introduced by Morton Stimler in his U.S. Pat. No. 2,952,464 and by Tadahiko Nakagiri et al in their U.S. Pat. No. 3,368,080. However, both of said proposed devices have identical shortcomings as will be described below, and therefore, they all lack the reliability desired in such apparatus.

It is often the case that a record player is employed for social gatherings, and it is often placed in a room or a hall under a strong and bright room lighting employed for indoor parties, or in a glary sunny garden used for garden parties. Assuming such bright lighting conditions as described above, the pick-up of a record player equipped with a light projector and a photoelectric element which scans a record, on its way toward a second band where there is music preselected by a selection system of the player, as shown in FIG. 2 of the drawings of the present invention, will no doubt be subject to some of the unwelcomed strong light rays of the room lighting or sun rays as described above other than that of its own light source, which are incidentally reflected from the unmodulated portions preceding the first and second sound track. These rays will be readily absorbed by the sensitive photoelectric elements, thereby incidentally causing misconduct of the selection system and further resulting in an unscheduled landing of the pick-up on a wrong sound track.

One other device that has been proposed by J. Andresen in his U.S. Pat. No. 2,732,539 which is no exception in respect of the shortcomings above-described. Moreover, with its light-luring lens (10 as shown in FIG. 1 of the drawings of his invention) in abutting relation with the sensitive photoelectric cell exposed forwardly and outwardly, it would easily be actuated incidentally by mere headlights of other vehicles passing by, thereby causing failure in its intended purposes.

SUMMARY OF THE INVENTION

The optimum result required in a selection system of the type of these inventions is that the system be actuated by the reflections of its own light source only. In order to meet that end, a keep-off-shield is contemplated which will ward off all the reflections of foreign light sources other than that of its own under any lighting conditions and under any circumstances, such as the one contemplated in the present invention.

The present invention contemplates an improvement of a detecting unit of a selection system of a phonographic player wherein a light source and a photoelectric element are housed in a single casing forming a sufficient light shield so that only the reflections of its own light source may impinge upon the photoelectric element, so as to ensure accurate actuation of the selection system without any incidental failure.

Therefore, one of the objects of the present invention is to provide a detecting unit in an automatic tune selection system of a phonographic record player having a reliable light shield capable of keeping off all the incidental reflections of lights other than that of its own.

Another object of the present invention is to provide a detecting unit of a selection system of a record player capable of operating accurately, without any incidental failure, under any lighting conditions and under any circumstances, in so far as light reflections are concerned.

BRIEF DESCRIPTION OF THE DRAWINGS

Other objects and advantages of the present invention will hereinafter become more fully apparent in the following description with reference to the accompanying drawings of a practical embodiment which is provided by way of example only, wherein.

DETAILED DESCRIPTION

Figure 1:
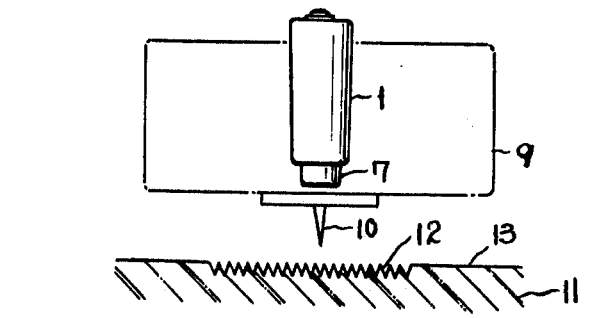
FIG. 1 is a diagrammatic view illustrating a detecting unit of the present invention having attached thereto the forehead of a pick-up of a phonographic record player, the stylus of the pick-up and a record disc in part, said pick-up being in a scanning position above the disc.
Figure 2:
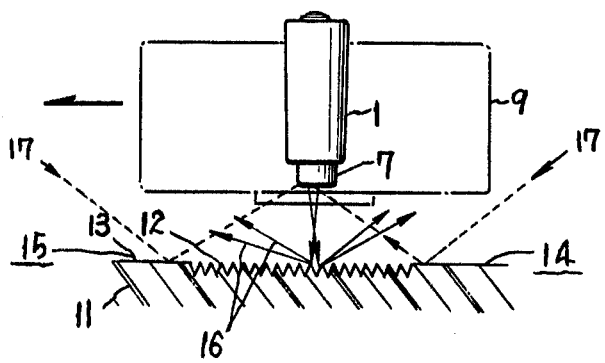
FIG. 2 is also a diagrammatic view illustrating light reflections of its own light source as well as that of the light source from outside, minus the stylus of said pick-up.

Referring more specifically to the drawings on which like numerals are employed to designate like parts throughout the views and more particularly to FIGS. 1 and 2, there is shown thereon a detecting unit designated generally by the numeral 1 having fixedly attached thereto the forehead of a pick-up 9 of a phonographic record player (not shown). The stylus of said pick-up 9 is designated by the numeral 10.

A phonographic record disc 11 is placed on a turntable (not shown) and has a plurality of sound tracks or modulated portions 12 as well as a plurality of unmodulated portions 13 forming a plurality of boundary bands between said modulated portions 12.

Referring particularly to FIG. 2, the numeral 14 represents a first band of unmodulated portion preceding a first band of modulated sound track 12, while the numeral 15 is a second band of unmodulated portion preceding a second band of modulated sound track 12. The numeral 16 indicates light rays of its own light source, while the numeral 17 indicates light rays of the light source from outside.

Figure 3:
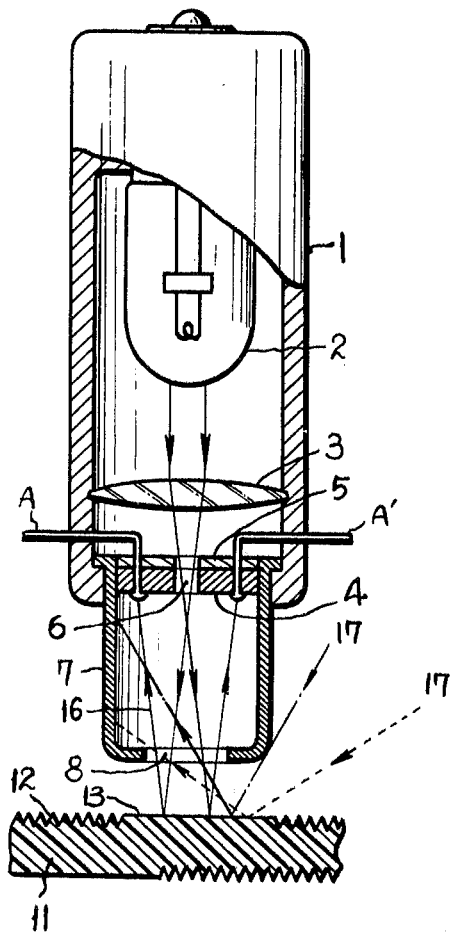
FIG. 3 is a vertical sectional view partly cut away of the detecting unit of this invention shown in FIGS. 1 and 2, illustrating it in a scanning position above the disc, minus the stylus of said pick-up.

Referring now specifically to FIG. 3, for the purpose of illustrating one preferred application and use of the detecting unit of the present invention, a lamp bulb or light source 2 is secured to the ceiling of the cylindrical housing of said detecting unit 1 and a lense 3 is disposed downwardly from said lamp bulb 2.

Extending axially downwardly through the constricted bottom opening of the cylindrical housing of said detecting unit 1 is a cylindrical light shield barrel 7, having a constricted aperture 8 formed therein at the lower end thereof. The barrel 7 has a flanged upper end bearing against the inner side of the housing bottom opening.

A CdS photoelectric element 4 having a light shield disc 5 disposed in abutting relation therewith on the top thereof is secured to the uppermost end of said cylindrical light shield barrel 7. The element 4 has a passage bore 6 formed in the center thereof, and a shield coating is preferably provided the peripheral surface of said bore 6.

It should be noted that, in accordance with the present invention, said light source 2 and said photoelectric element 4 are housed in a single casing to provide a simple construction. Consequently, both the outgoing light rays of said light source 2 and the incoming reflections of said light source 2 pass through a single passage, that is, said constricted aperture 8. Also the diameter of said aperture 8 is made smaller than that of said photoelectric element 4 and still smaller than that of the casing or said light shield barrel 7 in which it is housed so as to allow only such sharp angled reflections 16 of its own light source 2 as specifically shown in FIG. 3 to pass therethrough, and further reach up to and impinge upon said photoelectric element 4, keeping off all the reflections 17 from outside light sources such as the one also shown in FIG. 3.

Terminals A and A' connected with said CdS photoelectric element 4 and terminals for said light source 2 are electrically connected respectively to the known selection system of phonographic record player and circuitry system thereof.

The operation and purpose of the present invention will be clearly apparent as the description further proceeds.

Referring to FIG. 3, the light rays 16 of said light source 2 pass through said lense 3 disposed downwardly from said light source 2, then through said passage bore 6 formed in the center of said photoelectric element 4 and said light shield disc 5, then through said constricted aperture 8 formed on the lower end of said light shield barrel 7, and project downwardly and outwardly onto said unmodulated portion 13 of said record disc 11. The sharp angled reflections 16 reflected from said unmodulated portion 13 project upwardly through said constricted aperture 8 toward said photoelectric element 4 to impinge upon it, thereby actuating the selection system of the record player. However, such moderately angled reflections 17 as are also shown in FIG. 3, which hit the inner peripheral surfaces of said light shield barrel 7 and reflect therefrom, are so weak and insufficient to excite said photoelectric element 4, that there will be no actuation of the selection system.

Referring now particularly to FIG. 2, while said light reflections 16 of its own light source 2 hitting onto said modulated sound track 12 of said record disc 11 are diffused so as to be weak and insufficient to impinge upon said photoelectric element 4, said reflections 17 of the light source from outside hitting onto the sleek surfaces of said first band of unmodulated portion 13, 14 and of said second band of unmodulated portion 13, 15 are sharply directed to the lower end opening or said constricted aperture 8 of said cylindrical light shield barrel 7.

Now, let it be assumed by way of example that with the record player employed for indoor gatherings under an intensifying lighting conditions or for garden parties under a glaring sun ray, said pick-up 9 of the player scans above said disc 11, under a pre-direction of the selection system, and is on its way toward its destination, as indicated by a dark arrow shown in FIG. 2, that is, said second band of unmodulated portion 13, 15 preceding the modulated portion or the sound track where there is a certain music preselected by a selection system of the player.

While said reflections 17 of the light source from outside such as an indoor lighting system or sun rays reflected from said unmodulated portions 13, 14 and 13, 15 are warded off by said cylindrical light shield barrel 7 and said small constricted aperture 8 thereof from impinging upon said photoelectric element 4 of the present invention, which is deeply disposed upwardly from said aperture 8, thereby causing no actuation of the selection system thereof, the photoelectric elements of the prior art, at this stage, would readily absorb such reflections as said reflections, 17 of the light source from outside, thereby causing incidental actuation of the selection system and further resulting in unscheduled landing of the pick-up on a wrong sound track.

From the foregoing it should be apparent that the detecting unit of the present invention, thus provided with a sufficient light shield by the virtue of said cylindrical light shield barrel 7 and especially said constricted aperture 8 thereof which forms a limited passage for exclusive reception of sharp angled reflections 16 of its own light sources 2, excluding or at least making the reflections of outside light source such as said reflections 17 short of reaching said photoelectric element 4, as shown in FIG. 3, insures that only the reflections 16 of its own light source 2 may impinge upon said photoelectric element 4 so as to further ensure accurate actuation of the selection system without any incidental failure under any lighting environment.

Whereas the present invention has been fully disclosed with reference to a particular example thereof which produces satisfactory and reliable results, it is not so limited as it will be apparent to one skilled in the art to which the invention pertains, after understanding the invention, that various modifications and changes may be made without departing from the spirit and scope of the invention, and it is the intention, therefore, in the appended claim to cover all such modifications and changes.

What is claimed as new and desired to be secured by Letters Patent is:

1. A detecting unit for an automatic tune selection system of a phonographic record player comprising a light projector adapted to project light rays from a light source onto a portion of a face of a record disc and a CdS photoelectric element adapted to be impinged upon by the reflections of said light rays, a cylindrical casing housing said light projector and said photoelectric element, a light barrel shield fixed to the lower end portion of said casing and extending downwardly therefrom and having a constricted aperture formed on the lower end thereof, said photoelectric element being secured in said casing downwardly from said light source and upwardly from said constricted aperture, a light shield disc disposed on top of and in abutting relationship with said photoelectric element, said photoelectric element and light shield disc having a passage bore formed through the centers thereof providing a passage for said light rays of said light source which are projected therethrough, said constricted aperture forming a passage for both outgoing light rays of said light source and incoming reflections of said light rays reflected from a portion of the face of said record disc, the constricted aperture having a diameter which is substantially smaller than the diameter of said photoelectric element and also smaller than the inner diameter of said casing as well as the diameter of said light shield barrel, thereby forming a limited passage for the exclusive reception of sharp angled reflections of said light rays of said light source.

* * * * *